(12) United States Patent
Westrich et al.

(10) Patent No.: US 6,419,317 B1
(45) Date of Patent: Jul. 16, 2002

(54) SEAT DEPTH ADJUSTING DEVICE FOR AN AUTOMOBILE SEAT

(75) Inventors: Andreas Westrich, Schwedelbach; Joachim Zirkel, Krickenbach; Jochen Diemer, Hochspeyer, all of (DE)

(73) Assignee: Keiper GmbH & CO, Kaiserslautern (DE)

( * ) Notice: Subject to any disclaimer, the term of this patent is extended or adjusted under 35 U.S.C. 154(b) by 0 days.

(21) Appl. No.: 09/653,626

(22) Filed: Sep. 1, 2000

(30) Foreign Application Priority Data

Sep. 4, 1999 (DE) .......................... 199 42 351

(51) Int. Cl.⁷ .............................................. A47C 3/025
(52) U.S. Cl. ................. 297/284.11; 297/284.3; 297/312
(58) Field of Search .................. 297/284.11, 284.3, 297/284.1, 312, 452.4

(56) References Cited

U.S. PATENT DOCUMENTS

| | | | | |
|---|---|---|---|---|
| 3,600,037 A | * | 8/1971 | Lohr ...................... | 297/284.11 |
| 4,324,431 A | * | 4/1982 | Murphy et al. ......... | 297/284.11 |
| 4,334,709 A | | 6/1982 | Akiyama et al. | |
| 4,664,444 A | * | 5/1987 | Murphy ................. | 297/284.11 |
| 4,767,155 A | * | 8/1988 | Kousaka et al. .... | 297/284.11 X |
| 5,647,635 A | * | 7/1997 | Aumond et al. ....... | 297/284.11 |

FOREIGN PATENT DOCUMENTS

| | | | | |
|---|---|---|---|---|
| DE | 30 01 429 A1 | 7/1980 | | |
| DE | 41 04 440 C2 | 10/1991 | | |
| DE | 41 14 735 A1 | 11/1992 | | |
| DE | 693 01 206 T2 | 7/1993 | | |
| DE | 196 17 689 C1 | 7/1997 | | |
| EP | 0581 646 A1 | 2/1994 | | |
| JP | 0036732 | * | 3/1983 | ............. 297/284.11 |
| JP | 06284940 | * | 10/1994 | ............. 297/284.11 |

* cited by examiner

Primary Examiner—Laurie K. Cranmer
(74) Attorney, Agent, or Firm—Alston & Bird LLP

(57) ABSTRACT

A vehicle seat has a rear cushion part and a front cushion part which is movable relative to the rear cushion part for adjusting the depth of the vehicle seat. The front cushion part and the rear cushion part are designed and constructed separate from each other and covered with a common cover.

13 Claims, 2 Drawing Sheets

SEAT DEPTH ADJUSTING DEVICE FOR AN AUTOMOBILE SEAT

BACKGROUND OF THE INVENTION

The present invention relates to a device for adjusting the depth of a vehicle seat, in particular an automobile seat.

DE 41 04 440 C2 discloses a known seat depth adjusting device. In this known device, a flexible cushion part that is made as a one-piece cushion is provided with a continuous upholstered surface. The front portion of the flexible cushion rests upon a support member that is slideable for adjusting the seat depth. Depending on the desired seat depth, the front portion of the cushion is bent more or less over the front edge of the support member, with a spring compensating for the travel and providing the necessary tension. This seat depth adjusting device prevents a so-called crumbling fold. A crumbing fold occurs when separate cushion parts are present without a continuous upholstered surface.

SUMMARY OF THE INVENTION

One aspect of the present invention is an improved seat depth adjusting device. In accordance with this aspect, a seat part having an adjustable depth includes separate front and rear cushion parts. The front cushion part is mounted for being movable relative to the rear cushion part for adjusting the depth of the seat. The seat part further includes a cover extending over both the rear cushion part and the front cushion part. The cover is mounted so that it serves as a continuous, exterior upholstered surface extending over both the rear cushion part and the front cushion part. In accordance with one aspect of the present invention, a vehicle seat is provided. The vehicle seat includes the above-described seat part and a seat back positioned at a rear edge of the seat part.

Because the front cushion part and the rear cushion part are made separate from each other, it is relatively easy to move the front cushion part for adjusting the seat depth. In accordance with one aspect of the present invention, the front cushion part contacts the rear cushion part and deflects (e.g., bends) as it is moved relative to the rear cushion part. As a result of the deflection, the front cushion part undergoes no squeezing in the region of the front edge of the seat part. Advantageously, there is significant latitude in the selection of the thickness of the cushion parts, and manufacture can be relatively simple and cost favorable. As an additional advantage, a crumbling fold is prevented by the common cover.

In a preferred embodiment, the front cushion part is rotatable relative to the rear cushion part. This has the advantage of a simple manufacture and assembly. For example, the front cushion part can be rotated via a drive unit with a longitudinally displaceable push bar, which engages the front cushion part preferably off-center, i.e., approximately in the fashion of a connecting rod. In combination with a noncircular front cushion part, this causes a rotational movement, during which the front cushion part is moved forward and back over different distances. Due to the lever arm conditions, the off-center engagement of the drive with respect to the axis of rotation has the advantage that the drive force is smaller than, for example, in the case of a drive via a shaft in alignment with the axis of rotation.

In a further preferred embodiment, the front cushion part is arranged on a profiled base support, which has for example, a substantially triangular cross section, namely a cross section with rounded corners and bent sides. This base support preferably has a supporting mechanism mounted to one of the corners, and the drive unit, with its off-center engagement, is joined to the base support in the region of another one of the corners. In accordance with one example, a corner or a side of the triangle is oriented upward toward the cover at the smallest or greatest seat depth, and the triangle is rotated between the smallest and greatest seat depths. The front cushion part has on its upper side a different length as a function of the position of the triangle. In all positions, the two cushion parts are so close together that the upper seat surface that is provided by the upholstery material is supported by the cushion parts over substantially its entire length.

In accordance with one aspect of the present invention, material with little friction (for example, nonwoven/leather) is paired between the cover and the front cushion part for purposes of keeping frictional forces low during the movement of the front cushion part relative to the cover, namely for purposes of not having to overdimension the force that is to be applied by the drive unit. So that the cover remains taut and does not pucker, and for purposes of compensating for the amount of the cover that is needed when the seat depth is enlarged, it is preferred to provide an elastic adjusting element, for example, a rubber band or a spring. In the case of greater adjusted depths, it is preferred to cause the elastic adjusting element to follow, for example, the mounting point of the adjusting element by a corresponding kinematic motion.

BRIEF DESCRIPTION OF THE DRAWINGS

In the following, the invention is described in more detail with reference to an embodiment illustrated in the drawings, in which.

DETAILED DESCRIPTION OF THE INVENTION

Figure 1:
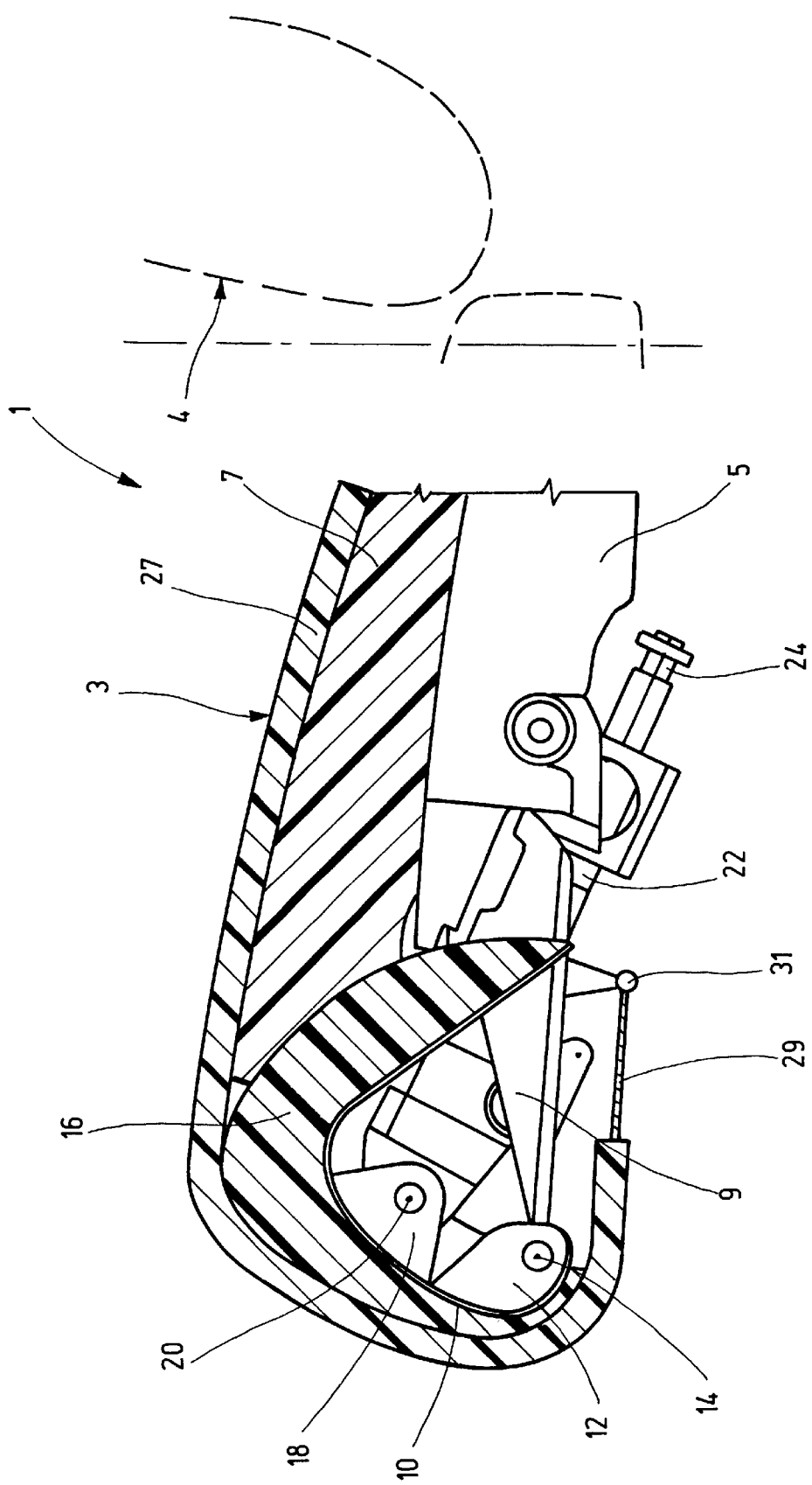
FIG. 1 is a partially sectioned side view of the embodiment in the case of the smallest adjustable seat depth.
Figure 2:
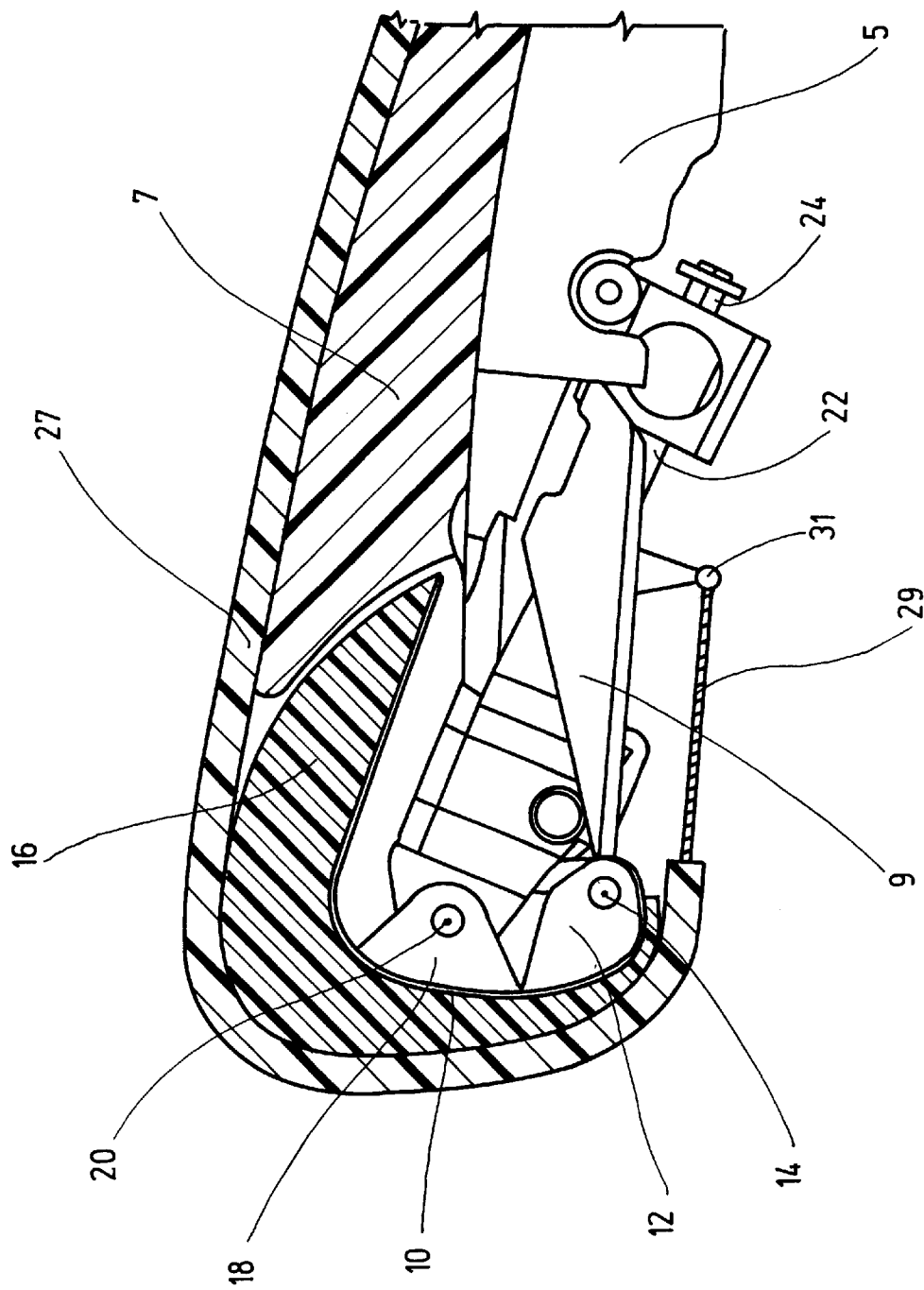
FIG. 2 is an illustration similar to FIG. 1 in the case of the greatest adjustable seat depth.

This invention may be embodied in many different forms and should not be construed as limited to the embodiment set forth below; rather, this embodiment is provided so that this disclosure will be thorough and complete. Like numbers refer to like elements throughout.

A seat 1 of an automobile is provided with a seat part 3 and a seat back 4 arranged at the rear edge of seat part 3. In the drawing, the seat back 4 is indicated by dashed lines. The seat part 3 includes a seat bucket 5, which mounts a seat cushion 7 serving as a padding. The seat depth, namely the spacing between the front edge of the seat part 3 and the seat back 4, is adjustable by means of a seat depth adjusting device, which is described in greater detail in the following.

The front edge of seat bucket 5 mounts a forward extending holder 9 on the left and the right side of the automobile seat 1. A profiled base support 10 has a cross section that remains substantially unchanged over the length of base support 10 and has the shape of a triangle with two rounded corners. The base support 10 can be made of plastic, and it preferably encloses only somewhat more than two sides of the triangle. The base support 10 extends transversely to the automobile seat 1. The base support 10 includes at its two ends, in the region of a corner of the triangle, respectively one pair of parallel side plates 12 and a bearing pin 14 therebetween. The bearing pins 14 are in alignment with each other and oriented transversely to the automobile seat 1. In addition, each bearing pin 14 extends through one of the holders 9 for rotatably supporting the base support 10.

The base support 10 mounts a front cushion 16 of foam, which has a more rounded cross section than the base support 10. On the base support 10 in the center between the bearing pins 14, but off-center in the region of a further corner of the triangle, a further side plate 18 is provided. A drive unit 22 is mounted to the side plate 18 via a pin 20. The drive unit 22 is obliquely oriented and mounted to the seat bucket 5. The drive unit 22 includes a linearly displaceable push bar 24 that is moved, for example, by means of an electric motor or by hand, via a gear connection, or via a hydraulic or pneumatic cylinder.

The base support 10 with cushion 16 is arranged such that the cushion 16 lies with one corner or with one side of the triangle against the seat cushion 7. The base support 10 with cushion 16 forms the front edge of the seat part 3. A cover 27 forming the upholstered surface of the seat part 3 extends over the upper side of seat cushion 7 and cushion 16 and over the front edge downward to the underside of base support 10, where a rubber band 29 is attached as an elastic adjusting element to the cover 27. The rubber band 29 is attached to a transverse bar 31 that extends crosswise to the vehicle seat 1 and is secured to holders 9. In accordance with one embodiment, the transverse bar 31 is designed and constructed such that it is displaceable by means of drive unit 22 along holders 9. At least the underside of cover 27 and the upper side of cushion 16 are made of paired materials with little friction, for example, a nonwoven and leather. More specifically and in one example, the underside of cover 27 is made of leather and the upper side of cushion 16 is made of a nonwoven material.

At the smallest seat depth, the base support 10 with cushion 16 is adjusted such that one corner of the triangle points upward. To change the seat depth, the drive unit 22 moves its push bar 24 linearly in its longitudinal direction, thereby causing the front portion of drive unit 22 to displace forward. This displacement acts upon pin 20 and is superposed by a slight pivotal movement. The base support 10 is moved via pin 20, which is arranged in off-center relationship to bearing pins 14. In so doing, it performs a rotational movement about bearing pins 14. As a result, the side of the triangle behind the previously upward directed corner slowly slides upward. During the movement, a shearing stress is exerted on cover 27 via friction, and a tensile stress via the enlarging surface. To compensate for the latter, the elastic band 29 stretches. If need be, transverse bar 31 is moved in addition, as mentioned above. At the greatest seat depth, the base support 10 with cushion 16 is adjusted such that the aforesaid corner of the triangle points forward, and that the side following it points almost exclusively upward. In the opposite direction of adjustment, the rubber band 29 provides the necessary tension in the cover 27.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A seat part for use in a vehicle seat and having an adjustable depth, the seat part comprising:
   a rear cushion part;
   a front cushion part that is a separate piece from the rear cushion part and is mounted to a base support having a generally triangular cross section;
   a supporting mechanism of a seat bucket of the vehicle seat is pivotably mounted to the base support proximate a first corner of the base support for supporting the base support;
   a drive unit mounted to the base support proximate a second corner of the base support, with the first and second corners being spaced apart from one another, wherein:
   the drive unit includes a longitudinally displaceable push bar and is operative to move the push bar in a first direction to rotate the base support together with the front cushion part about an axis of rotation relative to the rear cushion part to increase the depth of the seat part,
   the drive unit is further operative to move the push bar in a second direction to rotate the base support together with the front cushion part about the axis of rotation relative to the rear cushion part to decrease the depth of the seat part,
   a side of the base support is at least approximately the upper-most portion of the base support when the push bar has been moved in the first direction to substantially increase the depth of the seat part, and
   one of the corners of the base support is at least approximately the upper-most portion of the base support when the push bar has been moved in the second direction to substantially decrease the depth of the seat part; and
   a cover extending over both the rear cushion part and the front cushion part, wherein the cover is mounted so that the cover serves as a continuous, exterior upholstered surface extending over both the rear cushion part and the front cushion part.

2. A seat part according to claim 1, wherein the cover is mounted so that there is sliding contact between the front cushion part and the cover while the front cushion part is moved relative to the rear cushion part, and wherein the cover and the front cushion part are constructed of materials that are selected to restrict the amount of frictional force that results from the sliding contact between the front cushion part and the cover.

3. A seat part according to claim 1, further comprising an elastic adjusting device mounted for stretching the cover.

4. A seat part according to claim 1, further comprising a bearing pin, wherein the supporting mechanism is pivotably mounted to the base support proximate the first corner of the base support via the bearing pin, and the bearing pin and the axis of rotation are coaxial.

5. A seat part for use in a vehicle seat and having an adjustable depth, the seat part comprising:
   a rear cushion part;
   a front cushion part that is a separate piece from the rear cushion part and is mounted adjacent a front edge of the rear cushion part for rotating relative to the rear cushion part to adjust the depth of the vehicle seat in a longitudinal direction, with the rotating of the front cushion part being about an axis of rotation that is at least about perpendicular to the longitudinal direction;
   a drive unit including a push bar and operative for moving the push bar along a line of action in opposite first and second directions, with the push bar connected to the front cushion so that movement of the push bar in the first direction rotates the front cushion part about the axis of rotation and thereby increases the depth of the seat part, and movement of the push bar in the second direction rotates the front cushion part about the axis of rotation and thereby decreases the depth of the seat part; and a cover extending over both the rear cushion part and the front cushion part, wherein the cover is mounted so that the cover serves as a continuous, exterior upholstered surface extending over both the rear cushion part and the front cushion part, wherein the line of action of the push bar does not intersect the axis of rotation and at least a portion of the front cushion part that is positioned rearward of the axis of rotation is flexible and bends while the front cushion part rotates about the axis of rotation, so as to minimize dimensions of any gap defined between the front cushion part and the front edge of the rear cushion part in a manner so that, while the depth of the vehicle seat is adjusted, the cover remains substantially supported by the cushion parts in an area including and slightly forward of the front edge of the rear cushion part.

6. A seat part according to claim 5, further comprising a base support upon which the front cushion part is mounted.

7. A seat part according to claim 6, wherein the base support has a substantially triangular cross section.

8. A seat part according to claim 7, further comprising a supporting mechanism pivotably mounted to the base support proximate a first corner of the base support for supporting the base support in a manner so that the base support and the front cushion part are together rotatable about the axis of rotation.

9. A seat part according to claim 6, wherein the drive unit is mounted to the base support proximate a second corner of the base support.

10. A vehicle seat according to claim 5, wherein the cover is mounted so that there is sliding contact between the front cushion part and the cover while the front cushion part is moved longitudinally relative to the rear cushion part.

11. A vehicle seat according to claim 5, further comprising an elastic adjusting device mounted for stretching the cover.

12. A seat part according to claim 5, wherein the flexible portion of the front cushion part rotates upward while the front cushion rotates about the axis to increase the depth of the vehicle seat, and the flexible portion of the front cushion part rotates downward while the front cushion part rotates about the axis to decrease the depth of the vehicle seat.

13. A seat part according to claim 5, wherein the flexible portion of the front cushion part is in sliding contact with the rear cushion part while the front cushion part rotates about the axis.

* * * * *

UNITED STATES PATENT AND TRADEMARK OFFICE
CERTIFICATE OF CORRECTION

PATENT NO. : 6,419,317 B1  
DATED : July 16, 2002  
INVENTOR(S) : Westrich et al.

It is certified that error appears in the above-identified patent and that said Letters Patent is hereby corrected as shown below:

<u>Column 6,</u>
Line 7, "claim 6" should read -- claim 8 --.

Signed and Sealed this

Seventeenth Day of December, 2002

JAMES E. ROGAN
*Director of the United States Patent and Trademark Office*